(12) United States Patent
Ayala et al.

(10) Patent No.: US 10,730,394 B2
(45) Date of Patent: Aug. 4, 2020

(54) ELECTROMECHANICAL INTEGRATED MACHINE FOR ELECTRIFIED VEHICLES

(71) Applicant: FORD GLOBAL TECHNOLOGIES, LLC, Dearborn, MI (US)

(72) Inventors: Alejandro Ayala, Mexico City (MX); Francisco Javier Quintero Perez, Michoacan (MX); Ruben Ochoa, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 918 days.

(21) Appl. No.: 15/284,581

(22) Filed: Oct. 4, 2016

(65) Prior Publication Data

US 2018/0093576 A1  Apr. 5, 2018

(51) Int. Cl.
| | |
|---|---|
| *B60L 50/30* | (2019.01) |
| *B60L 15/32* | (2006.01) |
| *B60L 15/20* | (2006.01) |
| *B60K 1/02* | (2006.01) |
| *B60K 17/14* | (2006.01) |
| *H02K 7/106* | (2006.01) |
| *H02K 7/02* | (2006.01) |
| *H02K 16/00* | (2006.01) |
| *H02P 3/14* | (2006.01) |
| *H02P 3/24* | (2006.01) |
| *B60L 11/16* | (2006.01) |
| *H02K 7/00* | (2006.01) |

(Continued)

(52) U.S. Cl.
CPC ............... *B60L 11/16* (2013.01); *B60K 1/02* (2013.01); *B60K 1/04* (2013.01); *B60K 17/26* (2013.01); *B60L 7/16* (2013.01); *B60L 15/2009* (2013.01); *B60L 50/30* (2019.02); *B60L 53/20* (2019.02); *H02K 7/006* (2013.01); *H02K 7/025* (2013.01); *H02K 7/106* (2013.01); *H02K 7/116* (2013.01); *H02K 16/005* (2013.01); *H02K 16/02* (2013.01); *H02P 3/14* (2013.01); *B60K 2001/0416* (2013.01); *B60L 2240/12* (2013.01); *B60L 2240/423* (2013.01); *B60L 2250/26* (2013.01)

(58) Field of Classification Search
CPC .................................. B60L 50/11; B60L 50/30
See application file for complete search history.

(56) References Cited

U.S. PATENT DOCUMENTS

| | | | |
|---|---|---|---|
| 3,923,115 A | * | 12/1975 | Helling .................. B60K 6/105 180/65.25 |
| 4,423,794 A | | 1/1984 | Beck |

(Continued)

*Primary Examiner* — James A Shriver, II
*Assistant Examiner* — Vaughn Coolman
(74) *Attorney, Agent, or Firm* — David B. Kelley; Carlson, Gaskey & Olds, P.C.

(57) ABSTRACT

An electromechanical integrated machine (EIM) according to an exemplary aspect of the present disclosure includes, among other things, an internal rotor coupled to a vehicle wheel and an external rotor coupled to a flywheel. An electrified vehicle according to an exemplary aspect of the present disclosure includes, among other things, a first EIM associated with a first wheel, a second EIM associated with a second wheel, a battery having energy to power the first and second wheels, and a flywheel to receive energy from the first and second EIMs during braking. Each EIM includes an internal rotor coupled to the respective first or second wheel and an external rotor coupled to the flywheel.

22 Claims, 5 Drawing Sheets

(51) Int. Cl.
  *B60L 53/20* (2019.01)
  *B60K 1/04* (2019.01)
  *B60K 17/26* (2006.01)
  *B60L 7/16* (2006.01)
  *H02K 7/116* (2006.01)
  *H02K 16/02* (2006.01)

(56) References Cited

U.S. PATENT DOCUMENTS

| | | | | |
|---|---|---|---|---|
| 4,498,015 | A * | 2/1985 | Gottfried | B60L 50/30 290/15 |
| 4,588,040 | A | 5/1986 | Albright, Jr. et al. | |
| 4,629,947 | A * | 12/1986 | Hammerslag | H02J 3/30 318/161 |
| 4,680,986 | A | 7/1987 | Elsner | |
| 5,172,784 | A * | 12/1992 | Varela, Jr. | B60K 1/04 180/65.245 |
| 5,568,023 | A * | 10/1996 | Grayer | B60K 6/30 318/139 |
| 6,018,694 | A * | 1/2000 | Egami | B60K 6/24 701/102 |
| 6,173,574 | B1 * | 1/2001 | Obayashi | B60K 6/365 60/710 |
| 6,232,733 | B1 * | 5/2001 | Obayashi | B60W 20/15 318/432 |
| 6,753,619 | B2 | 6/2004 | Stevenson et al. | |
| 6,891,302 | B1 * | 5/2005 | Gabrys | F16O 39/063 310/178 |
| 7,014,586 | B2 * | 3/2006 | Randall | B60K 6/365 475/2 |
| 7,134,180 | B2 * | 11/2006 | Hsu | H02K 16/00 29/596 |
| 7,270,203 | B2 * | 9/2007 | Hsu | B60K 6/26 180/65.285 |
| 7,395,143 | B2 * | 7/2008 | Villata | B60K 6/448 701/54 |
| 7,416,039 | B1 | 8/2008 | Anderson et al. | |
| 7,552,787 | B1 * | 6/2009 | Williams | B60K 6/105 180/65.51 |
| 7,936,076 | B2 * | 5/2011 | Hsu | B60K 6/105 290/1 A |
| 8,006,794 | B2 * | 8/2011 | Gramling | B60K 6/105 180/165 |
| 8,511,415 | B1 * | 8/2013 | Copeland | B60L 11/1837 180/165 |
| 8,544,575 | B1 | 10/2013 | Scaringe et al. | |
| 8,733,480 | B2 * | 5/2014 | Watanabe | B60W 10/10 180/65.22 |
| 8,751,076 | B2 * | 6/2014 | Hennings | B60K 6/28 701/22 |
| 8,967,305 | B2 * | 3/2015 | Manganaro | B60K 7/0007 180/65.31 |
| 9,457,671 | B2 * | 10/2016 | Manganaro | B60L 58/10 |
| 9,490,687 | B2 * | 11/2016 | Watanabe | B60L 50/16 |
| 2004/0178009 | A1 * | 9/2004 | Pavlykivskyj | B60K 6/105 180/65.1 |
| 2007/0213158 | A1 * | 9/2007 | Laeuffer | B60K 6/105 475/5 |
| 2008/0173486 | A1 * | 7/2008 | Hsu | B60K 6/105 318/161 |
| 2009/0071734 | A1 * | 3/2009 | Hurkett | B60K 1/00 180/65.31 |
| 2010/0084999 | A1 * | 4/2010 | Atkinson, Jr. | B60K 1/00 318/139 |
| 2010/0276222 | A1 * | 11/2010 | Gramling | B60K 6/105 180/165 |
| 2011/0061953 | A1 | 3/2011 | Gibson et al. | |
| 2011/0068648 | A1 * | 3/2011 | Ananthakrishna | B60K 1/04 310/74 |
| 2011/0196556 | A1 * | 8/2011 | Hennings | B60K 6/28 701/22 |
| 2011/0278080 | A1 * | 11/2011 | Manganaro | B60K 7/0007 180/65.31 |
| 2012/0161497 | A1 * | 6/2012 | He | B60K 7/0007 301/6.5 |
| 2013/0015825 | A1 * | 1/2013 | Pullen | H02K 7/025 322/4 |
| 2014/0103761 | A1 * | 4/2014 | Atkins | B60K 6/105 310/74 |
| 2014/0183996 | A1 * | 7/2014 | He | H02K 49/102 310/74 |
| 2016/0347167 | A1 * | 12/2016 | Dorsett | B60L 50/30 |
| 2016/0348336 | A1 * | 12/2016 | Dorsett | B60L 50/30 |
| 2016/0361984 | A1 * | 12/2016 | Manganaro | B60L 58/10 |
| 2016/0361985 | A1 * | 12/2016 | Manganaro | B60L 50/30 |
| 2016/0362007 | A1 * | 12/2016 | Manganaro | B60L 58/10 |
| 2016/0362008 | A1 * | 12/2016 | Manganaro | B60L 58/10 |
| 2016/0362009 | A1 * | 12/2016 | Manganaro | B60L 58/10 |
| 2017/0025922 | A1 * | 1/2017 | Jian | H02K 7/025 |
| 2017/0149303 | A1 * | 5/2017 | Urch | B60L 50/30 |
| 2018/0034356 | A1 * | 2/2018 | Urch | B60L 58/12 |

* cited by examiner

| OPERATION STATUS | EIM FUNCTION | EIM TORQUE | POWER TO FLYWHEEL | POWER TO BATTERY | POWER TO WHEELS | COMMENTS |
|---|---|---|---|---|---|---|
| A | MOTOR | + | 0 | − | + | BATTERY PROVIDES ELECTRICAL ENERGY, FLYWHEEL BRAKE IS APPLIED |
| B | TORQUE CONVERTER AS BRAKE | − | + | 0 | − | VEHICLE INERTIA ENERGY IS TRANSFERRED TO THE FLYWHEEL DURING BRAKING |
| C | GENERATOR | − | − | + | 0 | FLYWHEEL ENERGY IS TRANSFERRED TO THE BATTERY. |
| D | TORQUE CONVERTER AS POWER BOOST | + | − | − | + | ENERGY STORED IN FLYWHEEL AND BATTERY IS USED TO ACCELERATE THE VEHICLE |
| OFF | OFF | 0 | 0 | 0 | 0 | NO REMAINING ENERGY IN THE FLYWHEEL. THE SYSTEM IS OFF. PLUG IN ENABLE |

− NEGATIVE
+ POSITIVE
0 ZERO

FIG.6

ELECTROMECHANICAL INTEGRATED MACHINE FOR ELECTRIFIED VEHICLES

TECHNICAL FIELD

This disclosure relates generally to electromechanical integrated machine (EIM) for an electrified vehicle. More particularly, the disclosure relates to an EIM system that couples internal and external rotors respective to vehicle wheels and a flywheel to more effectively recover energy and improve overall efficiency of the electrified vehicle.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. Efforts have been made in the industry to continue to increase the fuel economy and electric range of electrified vehicles.

SUMMARY

An electromechanical integrated machine (EIM), according to an exemplary aspect of the present disclosure, includes an internal rotor coupled to a vehicle wheel and an external rotor coupled to a flywheel.

In a further non-limiting embodiment of the foregoing EIM, there is a second internal rotor coupled to a second wheel and a second external rotor coupled to the flywheel, and wherein the external and internal rotors cooperate to provide a motor mode, a generator mode, a torque converter as a brake mode, and a torque converter as a power boost mode.

In a further non-limiting embodiment of any of the foregoing EIMs, when in the motor mode, an electromagnetic positive torque is generated between the external and internal rotors to drive the vehicle wheels while the flywheel is braked.

In a further non-limiting embodiment of any of the foregoing EIMs, when in the generator mode, service brakes are applied to the vehicle wheels; and electromagnetic negative torque is generated between the external and internal rotors to transfer flywheel energy to a battery.

In a further non-limiting embodiment of any of the foregoing EIMs, when in the torque converter as the brake mode, an electromagnetic negative torque is generated between the external and internal rotors, such that the internal rotors brake the vehicle wheels while the external rotors accelerate the flywheel to transfer vehicle inertia energy to the flywheel.

In a further non-limiting embodiment of any of the foregoing EIMs, when in the torque converter as the power boost mode, an electromagnetic positive torque is generated between the external and internal rotors such that energy stored in the flywheel and the battery are both used to accelerate the vehicle wheels.

An electrified vehicle according to an exemplary aspect of the present disclosure, includes a first EIM associated with a first wheel, a second EIM associated with a second wheel, a battery having energy to power the first and second wheels, and a flywheel to receive energy from the first and second EIMs during braking. Each EIM includes an internal rotor coupled to the respective first or second wheel and an external rotor coupled to the flywheel.

In a further non-limiting embodiment of any of the foregoing EIMs, the external rotors are coupled to the flywheel via a differential.

In a further non-limiting embodiment of any of the foregoing EIMs, the differential is positioned laterally between the first and second EIMs, and wherein the flywheel is positioned to extend at least partially below the differential in a vertical direction to lower a vehicle center of gravity.

In a further non-limiting embodiment of any of the foregoing EIMs, the internal rotors are coupled to the first and second wheels via respective first and second gear sets.

In a further non-limiting embodiment of any of the foregoing EIMs, the electrified vehicle includes a control unit configured to operate the first and second EIMs to provide a motor mode, a generator mode, a torque converter as a brake mode, and a torque converter as a power boost mode.

In a further non-limiting embodiment of any of the foregoing EIMs, when in the motor mode, an electromagnetic positive torque is generated between the external and internal rotors, such that the battery provides energy to drive the first and second wheels while the flywheel is braked.

In a further non-limiting embodiment of any of the foregoing EIMs, when in the generator mode, service brakes are applied to the first and second wheels; and electromagnetic negative torque is generated between the external and internal rotors to transfer flywheel energy to the battery.

In a further non-limiting embodiment of any of the foregoing EIMs, when in the torque converter as the brake mode, an electromagnetic negative torque is generated between the external and internal rotors such that the internal rotors brake the first and second wheels while the external rotor accelerates the flywheel to transfer vehicle inertia energy to the flywheel.

In a further non-limiting embodiment of any of the foregoing EIMs, when in the torque converter as the power boost mode, an electromagnetic positive torque is generated between the external and internal rotors, such that energy stored in the flywheel and the battery are both used to accelerate the first and second wheels.

A method according to an exemplary aspect of the present disclosure includes, associating a first EIM with a first wheel, associating a second EIM with a second wheel, providing a battery to power the first and second wheels, and transferring energy to a flywheel from the first and second EIMs during braking, wherein each EIM includes an internal rotor coupled to the respective first or second wheel and an external rotor coupled to the flywheel.

In a further non-limiting embodiment of the foregoing method, the method includes operating the first and second EIMs to provide a motor mode, a generator mode, a torque converter as a brake mode, and a torque converter as a power boost mode.

In a further non-limiting embodiment of any of the foregoing methods, the method includes generating an electromagnetic positive torque between the external and internal rotors when in the motor mode such that the battery provides energy to drive the first and second wheels while the flywheel is braked. The method also includes generating an electromagnetic negative torque between the external and internal rotors when in the generator mode to transfer flywheel energy to the battery while applying service brakes to the first and second wheels.

In a further non-limiting embodiment of any of the foregoing methods, the method includes generating an electromagnetic negative torque between the external and internal rotors when in the torque converter as the brake mode such that the internal rotors brake the first and second wheels while the external rotor accelerates the flywheel to transfer vehicle inertia energy to the flywheel.

In a further non-limiting embodiment of any of the foregoing methods, the method includes generating an electromagnetic positive torque between the external and internal rotors when in the torque converter as the power boost mode, such that energy stored in the flywheel and the battery are both used to accelerate the first and second wheels.

BRIEF DESCRIPTION OF THE FIGURES

The various features and advantages of the disclosed examples will become apparent to those skilled in the art from the detailed description. The figures that accompany the detailed description can be briefly described as follows:

FIG. 6 is a chart of the operation modes for of the electrified vehicle of FIG. 1.

DETAILED DESCRIPTION

Figure 1:
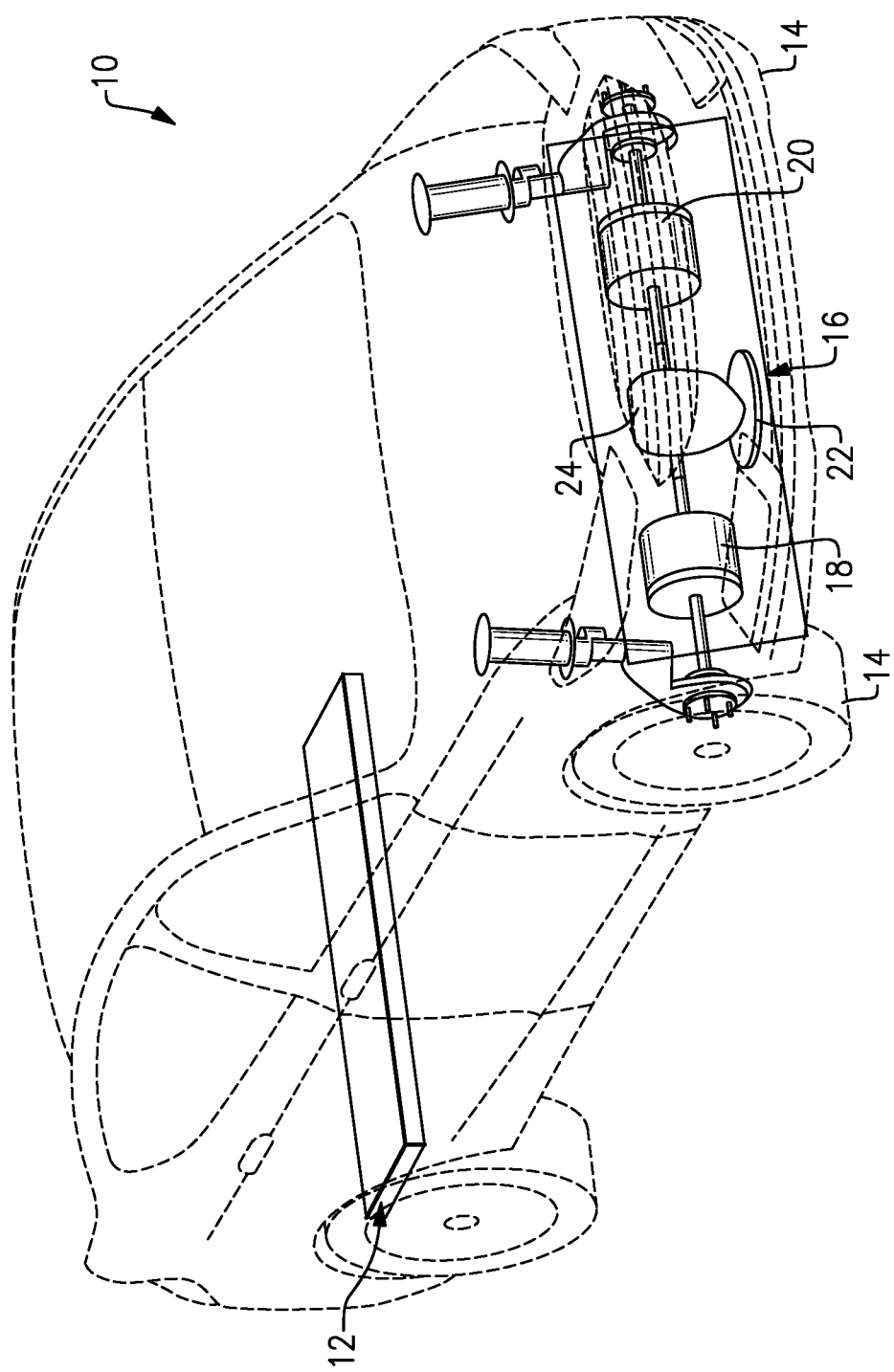
FIG. 1 shows a perspective view of an example electrified vehicle incorporating an electromechanical integrated machine according to the subject invention.
Figure 2:
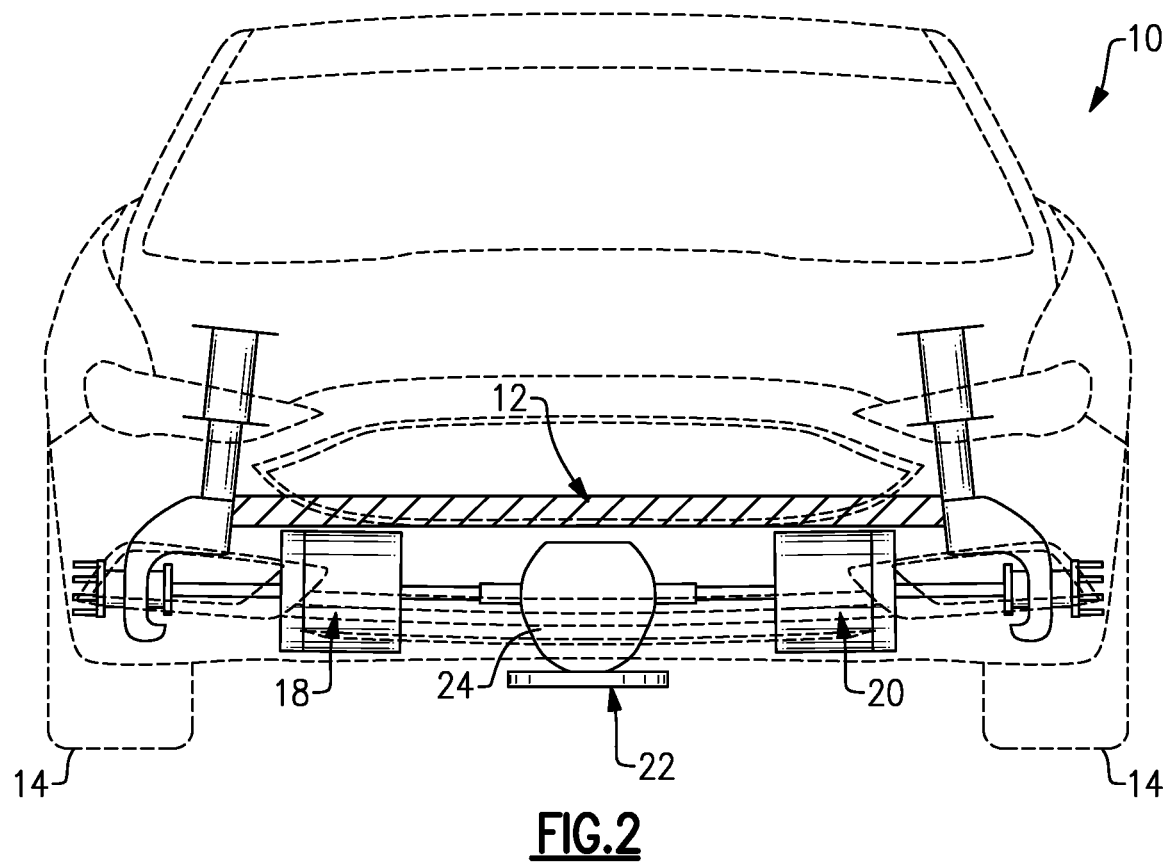
FIG. 2 is a front end view of the electrified vehicle shown in FIG. 1.

This disclosure relates generally to an electrified vehicle 10 as shown in FIGS. 1-2. The electrified vehicle 10 includes a battery 12 that stores energy, as known, to power a pair of vehicle wheels 14. An electromechanical integrated machine (EIM) system 16 is also used to power the vehicle wheels and to transfer energy back into the battery 12 under certain conditions. The EIM system 16 includes a first EIM 18 at a first wheel 14 and a second EIM 20 at an opposite second wheel 14. The EIMs 18, 20 are configured to be coupled to the wheels 14 and to a flywheel 22.

Figure 3:
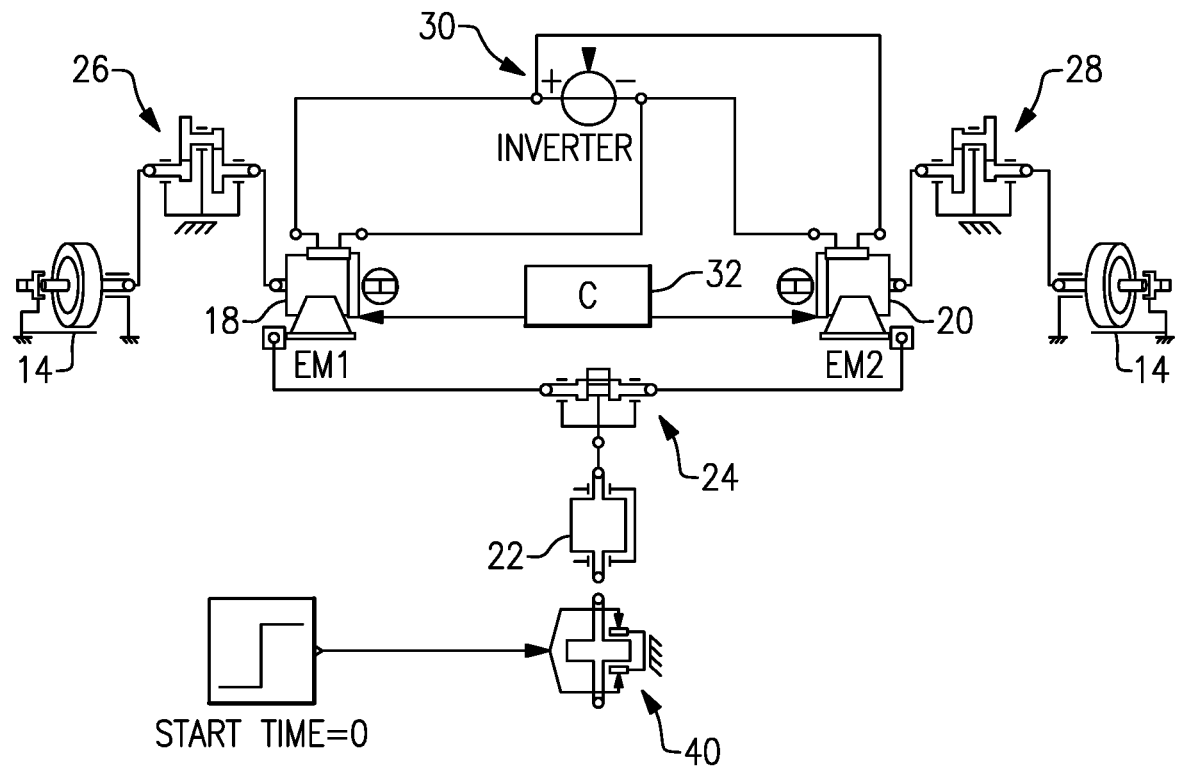
FIG. 3 is a schematic view of the EIM as used in the electrified vehicle shown in FIG. 1.

The EIMs 18, 20 are coupled to the flywheel 22 via a differential 24 as shown in FIG. 3. The differential 24 is positioned laterally between the EIMs 18, 20 and the flywheel 22 is positioned to extend at least partially below the differential 24 in a vertical direction to lower a vehicle center of gravity. This lower center of gravity improves performance and handling of the vehicle 10.

The first EIM 18 is coupled to the first wheel with a first gear set 26 and the second EIM 20 is coupled to the second wheel 14 with a second gear set 28. The gear sets 26, 28 have a gear ratio configured to provide a speed reduction to the vehicle wheels 14 from the higher speed output from the EIMs 18, 20. An inverter 30 is electrically connected to the EIMs 18, 20 and a control unit 32 is used to control the various modes of operation for the EIM system 16. This will be discussed in greater detail below.

Range autonomy is one challenge for the commercial success of electrified vehicles. Current ranges for electrified vehicles can be 80% lower than conventional gasoline vehicles. Electrified vehicles can recover kinetic energy during braking events by converting the kinetic energy to electrical energy and then storing the energy as chemical energy in the battery. However, the efficiency of recovering this energy is reduced by each energy transformation. During hard braking events on electrified vehicles, not all of the kinetic energy can be transferred to the battery because the electrical power generated during braking surpasses the battery storage capacity. For example, a current electrified vehicle regenerative braking system has an average efficiency of 26%.

In order to improve performance of electrified vehicles, the use of flywheels has been considered to reduce battery usage and improve performance. However, the challenge with using flywheels is how to maximize the energy recuperation and to transfer the vehicle kinetic energy to the flywheel during braking events. Currently there are two types of flywheel systems, with one type using complicated mechanisms with continuously variable transmissions (CVT), and the other type using a secondary electrical machine to accelerate the flywheel with the electrical energy generated by the motor coupled to the propulsion wheels. The disadvantage with both of these systems is the use of additional components that add weight to the vehicle, and the reduction of efficiency due to multiple energy transformations for storage purposes.

Figure 4:
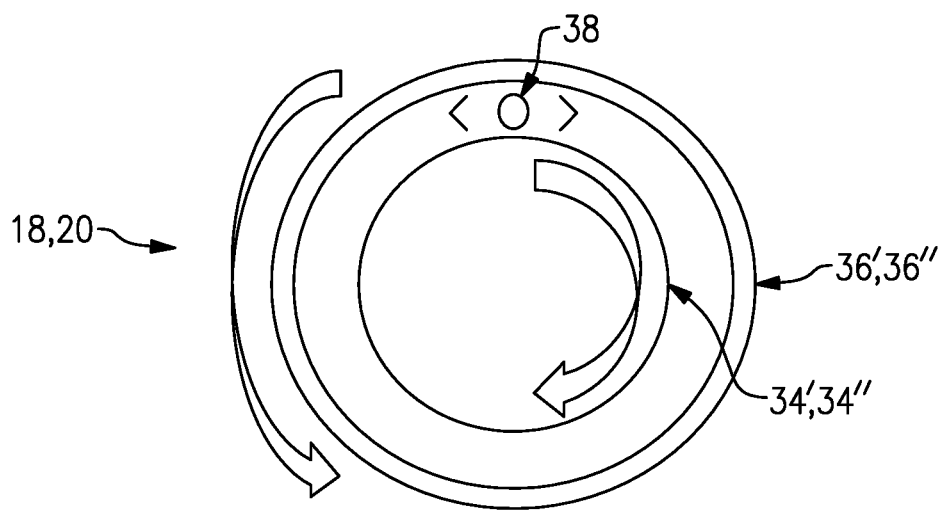
FIG. 4 is a schematic representation of an EIM of FIG. 3 generating an electromagnetic torque.

The subject EIM system 16 reduces overall system complexity by using an electromechanical engagement to recover the kinetic energy during braking events and to transfer the energy to the flywheel 22. The EIM system 16 uses the two EIMs 18, 20 in a configuration with an unfixed stator. Thus, the stator is used as an external rotor. As shown in FIG. 4, the first EIM 18 includes an internal permanent magnet rotor 34' that is connected to the respective wheel 14 and an external winding armature rotor 36' that is connected through the differential 24 to the flywheel 22 (FIG. 3). The second EIM 20 includes an internal winding armature rotor 34" that is connected to the respective wheel 14 and an external permanent magnet rotor 36" that is connected through the differential 24 to the flywheel 22 (FIG. 3). In the first 18 and second 20 EIMs an electromagnetic torque, induced by alternating current (AC) supplied to the winding armature rotor 36', 34", is applied between internal 34', 34" and external 36', 36" rotors accelerating them in opposite ways, schematically shown at 38 in FIG. 3. For example, when an electromagnetic field below the frequency of the wheel 14 is applied, an electromagnetic negative torque is generated to brake the vehicle 10 while at the same time accelerating the flywheel 22.

As such, the subject EIM system 16 maximizes total range autonomy by improving efficiency based on an integrated electrical system that utilizes the flywheel 22 to store kinetic energy. The EIM system 16 provides multiple integrated functions including: a motor function to accelerate the vehicle; a generator function to brake the vehicle; a torque converter function to transfer the kinetic energy to the flywheel 22 during all braking events; and a torque vectoring function. Energy efficiency is improved by reducing the number of energy transformations: kinetic to electric alternating current (AC), to electric direct current (DC), to chemical and vice versa. By utilizing the flywheel 22, the number of energy transformations is reduced by transferring the vehicle inertia kinetic energy to a rotational moment of inertia kinetic energy at the flywheel 22 during braking events.

Figure 5:
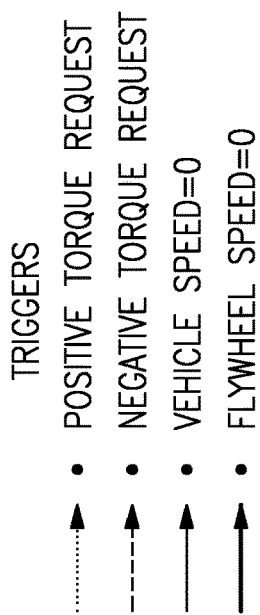
FIG. 5 is a control diagram for the EIM of FIG. 3.
Figure 5:
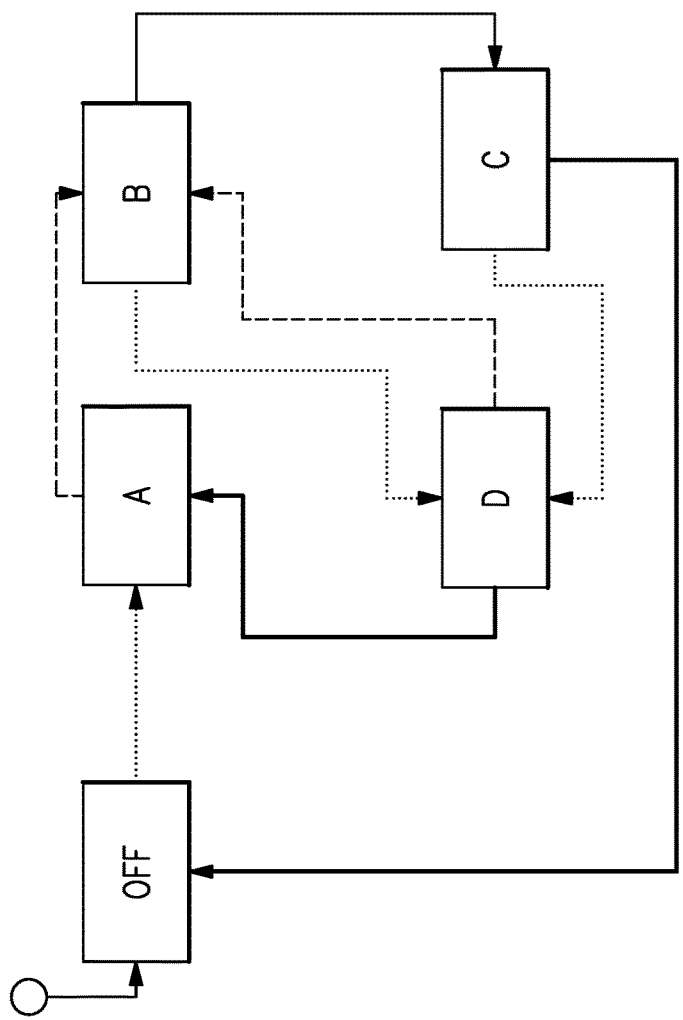

As discussed above, the control unit 32 is used to control the various modes of operation for the EIM system 16 which include a motor mode, a generator mode, a torque converter as a brake mode, and a torque converter as a power boost mode. FIGS. 5-6 disclose the control diagram and operation modes for the EIM system 16. Each of the modes will be discussed in detail below.

As shown in FIG. 5, in the Electric Machine as motor (Mode A), there is a positive torque generated on the EIMs 18, 20 according to an accelerator pedal position, a flywheel brake 40 (FIG. 3) is applied to prevent power being transferred to the flywheel 22, and energy is provided by the battery 12. As such, in this motor mode (A) as shown in FIG. 6, an electromagnetic positive torque (+) is generated between the external 36 and internal 34 rotors to provide positive power (+) to drive the vehicle wheels 14 while the flywheel is braked (zero power), and the battery is in a negative (−) mode as the battery is providing electrical energy to the EIM system 16.

As shown in FIG. 5, in the Electric Machine as torque convertor (Mode B), there is a negative torque generated on the EIMs 18, 20 according to brake pedal position, the flywheel brake 40 (FIG. 2) is disengaged and the external rotors 36 start moving with negative speed. The negative torque decelerates the vehicle while also generating electric energy and accelerating the flywheel 22 with negative speed. As shown in FIG. 6, in this torque converter mode (B), i.e. torque converter as a brake, an electromagnetic negative torque (−) is generated between the external 36 and internal rotors 34 and negative power (−) is provided to the wheels for braking while positive power (+) is supplied to the flywheel 22 and zero power is provided to the battery 12.

As shown in FIG. 5, in the Electric Machine as generator (Mode C), the vehicle 10 stops completely, service brakes are applied to avoid the negative torque impulse which would move the vehicle backward, and the flywheel continues rotating while energy is slowly being transferred to the battery 12 by the EIMs 18, 20. As such, in this generator mode (C) as shown in FIG. 6, service brakes are applied so that there is zero power to the vehicle wheels 14 and an electromagnetic negative torque (−) is generated between the external 36 and internal 34 rotors to transfer flywheel kinetic energy to the battery 12. In other words, the flywheel is considered as being at a negative power (−) as the flywheel 22 is transferring positive energy/power (+) to the battery 12.

As shown in FIG. 5, in the Electric Machine using flywheel as power boost (Mode D), the flywheel 22 continues to rotate and there is a positive torque applied on the EIMs 18, 20 to decelerate the flywheel 22 and accelerate the vehicle 10. As such, in this power boost mode (D) as shown in FIG. 6, an electromagnetic positive torque (+) is generated between the external 36 and internal 34 rotors such that kinetic energy stored in the flywheel 22 and the battery 12 are both used to accelerate the vehicle wheels with positive power (+). In other words, the flywheel 22 is considered as being at a negative power (−) and the battery 12 is considered as being at negative power (−) because they are both being used to accelerate the vehicle 10.

Finally, in the OFF Mode shown in FIG. 6, the vehicle 10 and the EIM function are off. There is no remaining energy in the flywheel 22. The vehicle 10 can then be recharged via a plug-in mode as known.

The subject EIM system 16 transfers the kinetic energy produced during braking events to the flywheel via the EIM as an electric torque converter to provide a high efficiency system by avoiding multiple energy transformations. As discussed above, the two traditional types of flywheel usage in electrified vehicles have several disadvantages. The disadvantage of electrified vehicles using a flywheel with a continuously variable transmission (CVT) is that kinetic energy during a braking event is transferred using a clutch to engage the flywheel, and the system requires a very complex transmission for acceleration purposes. Further, the effectiveness and reliability of the system is reduced due to the significant number of additional components that are required. The disadvantage of electrified vehicles using a flywheel that with a second electrical machine to accelerate the flywheel is the requirement of high current electrical wiring, which reduces the efficiency due to the multiple energy transformations that are required.

In the subject EIM system 16 the kinetic energy is transferred to the flywheel 22 by an electromagnetic torque generated between the winding armature rotor 36', 34" and the permanent magnet rotor 34', 36". This avoids complicated clutch based CVT systems and/or the addition of a second electrical machine to transfer braking kinetic energy to electric and back to kinetic at the flywheel. This significantly improves efficiency and reliability. Further, it has been found that using the EIM during regenerative braking will improve efficiency from 26% to 66% from the regenerative braking event to the acceleration event. Also, battery life is improved because the number of charging-discharging cycles is reduced by 25%.

Additionally, by using the subject EIM system 16, handling stability and ride comfort are improved due to the horizontal position of the flywheel 22 at the bottom of the vehicle 10 and the gyroscopic momentum effect of its rotational movement. Performance is also improved due to the usage of two EIMs, one on each driven wheel, to provide a torque vectoring feature, without actuation of the hydraulic brake system versus the conventional torque vectoring devices that wear the braking system.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An electromechanical integrated machine (EIM) comprising:
    a first internal rotor comprising an internal permanent magnet rotor that is coupled to a first vehicle wheel;
    a first external rotor coupled to a flywheel;
    a second internal rotor comprising an internal winding armature rotor that is coupled to a second vehicle wheel; and
    a second external rotor coupled to the flywheel, wherein the first and second external rotors are coupled to the flywheel via a differential, and wherein the first external rotor comprises an external winding armature rotor that is connected through the differential to the flywheel, and the second external rotor comprises an external permanent magnet rotor that is connected through the differential to the flywheel.

2. The electromechanical integrated machine as recited in claim 1 wherein kinetic energy is transferred to the flywheel by an electromagnetic torque generated between the external and internal rotors to provide a motor mode, a generator mode, a torque converter as a brake mode, and a torque converter as a power boost mode without requiring a clutch.

3. The electromechanical integrated machine as recited in claim 2 wherein, when in the motor mode, an electromagnetic positive torque is generated between the external and internal rotors to drive the vehicle wheels while the flywheel is braked.

4. The electromechanical integrated machine as recited in claim 3 wherein, when in the generator mode, service brakes are applied to the vehicle wheels and an electromagnetic negative torque is generated between the external and internal rotors to transfer flywheel energy to a battery.

5. The electromechanical integrated machine as recited in claim 4 wherein, when in the torque converter as the brake mode, an electromagnetic negative torque is generated between the external and internal rotors such that the internal rotors brake the vehicle wheels while the external rotors accelerate the flywheel to transfer vehicle inertia energy to the flywheel.

6. The electromechanical integrated machine as recited in claim 5 wherein, when in the torque converter as the power boost mode, an electromagnetic positive torque is generated between the external and internal rotors such that energy stored in the flywheel and the battery are both used to accelerate the vehicle wheels.

7. The electromechanical integrated machine as recited in claim 1 wherein an electromagnetic torque, induced by alternating current supplied to the winding armature rotors, is applied between the internal and external rotors accelerating the internal and external rotors in opposite ways such that, when an electromagnetic field below a frequency of the first and second wheels is applied, an electromagnetic negative torque is generated for braking while at the same time accelerating the flywheel.

8. An electrified vehicle comprising:
a first EIM associated with a first wheel;
a second EIM associated with a second wheel;
a battery having energy to power the first and second wheels; and
a flywheel to receive energy from the first and second EIMs during braking, wherein each EIM includes an internal rotor coupled to the respective first or second wheel and an external rotor coupled to the flywheel, and wherein the external rotors are coupled to the flywheel via a differential, and wherein the internal rotor of the first EIM comprises an internal permanent magnet rotor that is connected to the first wheel and the external rotor of the first EIM comprises an external winding armature rotor that is connected through the differential to the flywheel, and wherein the internal rotor of the second EIM comprises an internal winding armature rotor that is connected to the second wheel and the external rotor of the second EIM comprises an external permanent magnet rotor that is connected through the differential to the flywheel.

9. The electrified vehicle as recited in claim 8 including a control unit configured to operate the first and second EIMs to provide a motor mode, a generator mode, a torque converter as a brake mode, and a torque converter as a power boost mode.

10. The electrified vehicle as recited in claim 9 wherein, when in the torque converter as the brake mode, an electromagnetic negative torque is generated between the external and internal rotors, such that the internal rotors brake the first and second wheels while the external rotor accelerates the flywheel to transfer vehicle inertia energy to the flywheel.

11. The electrified vehicle as recited in claim 9 wherein, when in the torque converter as the power boost mode, an electromagnetic positive torque is generated between the external and internal rotors such that energy stored in the flywheel and the battery are both used to accelerate the first and second wheels.

12. The electrified vehicle as recited in claim 9 wherein, when in the motor mode, an electromagnetic positive torque is generated between the external and internal rotors such that the battery provides energy to drive the first and second wheels while the flywheel is braked.

13. The electrified vehicle as recited in claim 9 wherein, when in the generator mode, service brakes are applied to the first and second wheels and an electromagnetic negative torque is generated between the external and internal rotors to transfer flywheel energy to the battery.

14. The electrified vehicle as recited in claim 8 wherein the differential is positioned laterally between the first and second EIMs, and wherein the flywheel is positioned to extend at least partially below the differential in a vertical direction to lower a vehicle center of gravity.

15. The electrified vehicle as recited in claim 8 wherein the internal rotors are coupled to the first and second wheels via respective first and second gear sets.

16. The electrified vehicle as recited in claim 8 wherein kinetic energy is transferred to the flywheel by an electromagnetic torque generated between the winding armature rotors and the permanent magnet rotors without requiring a clutch.

17. A method comprising:
associating a first EIM with a first wheel;
associating a second EIM with a second wheel;
providing a battery to power the first and second wheels; and
transferring energy to a flywheel from the first and second EIMs during braking, wherein each EIM includes an internal rotor coupled to the respective first or second wheel and an external rotor coupled to the flywheel, and wherein the external rotors are coupled to the flywheel via a differential, and wherein the internal rotor of the first EIM comprises an internal permanent magnet rotor that is connected to the first wheel and the external rotor of the first EIM comprises an external winding armature rotor that is connected through the differential to the flywheel, and wherein the internal rotor of the second EIM comprises an internal winding armature rotor that is connected to the second wheel and the external rotor of the second EIM comprises an external permanent magnet rotor that is connected through the differential to the flywheel.

18. The method as recited in claim 17 including operating the first and second EIMs to provide a motor mode, a generator mode, a torque converter as a brake mode, and a torque converter as a power boost mode.

19. The method as recited in claim 18 including generating an electromagnetic negative torque between the external and internal rotors when in the torque converter as the brake mode such that the internal rotors brake the first and second wheels while the external rotor accelerates the flywheel to transfer vehicle inertia energy to the flywheel.

20. The method as recited in claim 18 including generating an electromagnetic positive torque between the external and internal rotors when in the torque converter as the power boost mode such that energy stored in the flywheel and the battery are both used to accelerate the first and second wheels.

21. The method as recited in claim 18 including
generating an electromagnetic positive torque between the external and internal rotors when in the motor mode such that the battery provides energy to drive the first and second wheels while the flywheel is braked, and
generating an electromagnetic negative torque between the external and internal rotors when in the generator mode to transfer flywheel energy to the battery while applying service brakes to the first and second wheels.

22. The method as recited in claim 17 wherein an electromagnetic torque, induced by alternating current supplied to the winding armature rotors, is applied between the internal and external rotors accelerating the internal and external rotors in opposite ways such that, when an electromagnetic field below a frequency of the first and second wheels is applied, an electromagnetic negative torque is generated for braking while at the same time accelerating the flywheel.

* * * * *